United States Patent [19]
Adeney et al.

[11] Patent Number: 4,696,957
[45] Date of Patent: Sep. 29, 1987

[54] MULTI-COMPONENT COATING COMPOSITIONS

[75] Inventors: Hilary E. Adeney, Surrey Hills; Derrard M. Hall, Glen Waverley, both of Australia

[73] Assignee: Dulux Australia Ltd., Victoria, Australia

[21] Appl. No.: 753,067

[22] Filed: Jul. 9, 1985

[30] Foreign Application Priority Data

Aug. 27, 1984 [AU] Australia .............................. PG6784

[51] Int. Cl.$^4$ ....................... C08G 59/18; C08G 59/42
[52] U.S. Cl. .................................. 523/406; 523/402; 524/906
[58] Field of Search ................. 523/402, 406; 524/906

[56] References Cited

U.S. PATENT DOCUMENTS

| | | | |
|---|---|---|---|
| 3,620,989 | 11/1971 | Cummings | 525/7 |
| 3,847,851 | 11/1974 | Tugukuni et al. | 523/221 |
| 4,217,261 | 8/1980 | Sekmakas et al. | 523/402 |
| 4,373,054 | 2/1983 | Gibson et al. | 525/438 |
| 4,413,073 | 11/1983 | Gibson et al. | 524/458 |
| 4,482,659 | 11/1984 | Sanjana et al. | 523/414 |
| 4,544,686 | 10/1985 | Bromley et al. | 523/402 |

FOREIGN PATENT DOCUMENTS

| | | | |
|---|---|---|---|
| 53-67000 | 6/1978 | Japan | 524/906 |
| 429658 | 2/1980 | U.S.S.R. | 524/906 |

Primary Examiner—Ronald W. Griffin
Attorney, Agent, or Firm—Cushman, Darby & Cushman

[57] ABSTRACT

This invention relates to aqueous "multi-pack" coating compositions, that is, those which comprise at least two discrete components (or "packs") which are mixed prior to application.

Prior attempts to provide an aqueous multi-pack composition have failed to provide a suitable combination of the desirable characteristics of adequate "pot-life" (the time for which the mixed components remain workable) and early development of adequate mechanical properties.

The compositions of the present invention which provide such a combination consist of a number of components which together comprise a constituent having epoxide groups, a constituent comprising addition polymer in the form of an aqueous dispersion and a constituent capable of reacting with epoxide groups. In an especially preferred embodiment, the aqueous addition polymer dispersion is combined with at least one of the other constituents in the form of a multi-polymer particle dispersion.

The composition are useful in the automotive refinish and heavy duty coatings areas.

6 Claims, No Drawings

MULTI-COMPONENT COATING COMPOSITIONS

DISCLOSURE

This invention relates to coating compositions and more particularly to water-based multi-component coating compositions.

Multi-component coating compositions wherein the compositions comprise at least two components which are blended prior to application are well known to the art and have been used extensively for many years. They are especially useful in areas where it is impracticable to apply more than slight heating to a coated substrate in order to cure the coating. A typical example of such an area is the motor vehicle refinish industry. A further advantage of multicomponent systems is that it is easier to obtain optimum film properties. A single component thermosetting system must be both stable in a container, often for a long period, and able to react on application to form a cross-linked film; the simultaneous satisfying of these two conditions places constraints on the type of film-forming material which can be used.

Multi-component systems are not so constrained and the components can be formulated to give the best film properties; in addition careful formulation has ensured that such systems have an adequate "pot-life" (the time for which the mixed components remain workable). Thus, many heavy-duty systems which are required to have optimum performance under harsh conditions are multi-component systems. Well-known examples of multi-component systems are the epoxy/amine and urethane (isocyanate-cured) systems, both of which offer outstanding properties and which are extensively described in the literature.

Multi-component coating compositions have hitherto generally been organic solvent-based, but the constantly increasing cost of such solvents plus the desirability of reducing atmospheric pollution and health hazards has led to considerable interest in the possibility of water-based multi-component coating compositions. One example of such a coating composition comprises an aqueous epoxy resin and an aqueous amine hardener. However, it is often important in practice not only that coating compositions should have good pot life and good ultimate properties, but also that these good ultimate properties should be developed as quickly as possible. Known water-based multi-component coating compositions require unacceptably long times before they develop important properties such as acceptable hardness for service conditions, and this severely reduces their usefulness. The best of the known aqueous compositions comprise in addition to the typical ingredients of a two-component system a low molecular weight acrylic solution polymer. Compositions of this type have been marketed, but they are still clearly inferior to the known solvent-based compositions.

We have now found that it is possible to prepare multi-component coating compositions which combine the advantages of being water-based and of having good pot life with a speed of attainment of properties which can match and even exceed that of comparable solvent-based compositions. We therefore provide, according to the present invention, an aqueous coating composition comprising at least two discrete components which are mixed prior to the application of the composition to a substrate and which then react to form a continuous cross-linked coating film, the components comprising overall
 (a) a constituent having a number average molecular weight of from 200–10,000 and comprising at least one epoxide group per molecule;
 (b) an aqueous film-forming dispersion which comprises addition polymer; and
 (c) a constituent capable of reaction with epoxide groups.

In this specification, constituent (a) shall hereinafter be referred to as the "epoxide constituent", constituent (b) as the "dispersion constituent" and constituent (c) as the "reactive constituent".

In the simplest form of our invention, the three constituents (a), (b) and (c) are kept in separate containers and mixed immediately prior to application. However, it is preferable for reasons of convenience of storage and use that only two containers be used. This may be achieved by blending (b) into either or both (a) or (c). In general, this embodiment of our invention works well so far as film properties are concerned, but many compositions of this type have been observed to have relatively short pot lives, which limits practical usefulness.

This limitation does not affect a preferred form of the invention wherein the individual particles of the dispersion constituent are blends of addition polymer and one of the other constituents. Such dispersions can readily be prepared by the techniques used in the preparation of multi-polymer particles. By "multi-polymer particles" we mean particles which comprise a blend of at least two polymers, at least one of which polymers (the "in situ polymer") is formed in the presence of at least one other polymer (the "pre-formed polymer"). Such particles and their preparation are described in, for example, British Pat. Nos. 1,417,713, 1,421,113 and 1,515,723, European Patent Application No. 0 010 424, U.S. Pat. Nos. 3,620,989, 4,373,054 and 4,413,073 and PCT Application No. WO84/00169.

Thus, the epoxide constituent or the reactive constituent may be the "pre-formed polymer" and the addition polymer the "in-situ polymer" in a dispersion constituent. In some cases (as will be further discussed hereinunder), the epoxide constituent or the reactive constituent or both may be polymeric and the disperse particles are actually "multi-polymer" in that all constituents are polymeric in nature. However, the method of preparation will work equally well with oligomeric and non-polymeric epoxide constituents and reactive constituents, and many of these give excellent results. Further references to "multi-polymer particles" and "pre-formed polymer" in this specification should thus be considered to encompass the use of such non-polymeric constituents As stated in the preceding paragraph, either or both of the constituents (a) and (b) may be incorporated into an aqueous dispersion of multi-polymer particles, but it is generally the epoxide constituent which is used as the pre-formed polymer. This is done for a number of reasons, including the fact that the epoxide constituent generally is not as water-soluble or -dispersible as the reactive constituent. The multi-polymer particle approach can result in a unique blend of properties which combines the best features of the epoxide constituent and the addition polymer.

The epoxide constituent may be selected from a wide range of materials known to the art which have at least one (and preferably about 2) epoxide groups per molecule and which comply with the abovementioned molecular weight limits. Materials at the top end of our molecular weight range are solids which have to be dissolved, and we prefer to work lower in the range where the materials are liquids or low melting point solids. We have found that, for our purposes, especially good materials are bisphenol A-epichlorhydrin epoxy resins of molecular weight of from about 350–1200. Suitable materials can be selected, for example, from the "Epikote" or "Epon" (registered trade marks) range produced by the Shell Chemical Co. Such epoxy resins are especially suitable for use with our preferred multi-polymer particle method.

It is permissible, of course, to utilise a blend of different epoxy resins instead of a single epoxy resin. (In some cases, the commercially-available single epoxy resins are themselves really mixtures of different molecular weight compounds). In this case it is permissible for part of the epoxy resin blend to have a molecular weight outside the stated limits, provided that the average molecular weight of the blend lies within the limits.

Other epoxy group-containing materials may be utilised in our invention. It is possible, for example, to take a polymeric material with no epoxide groups and add such groups by reacting the material with a suitable epoxide group-containing material. The comments on individual and collective molecular weights in the immediately preceding paragraph also apply here.

When the epoxide constituent is to be an individual constituent, that is, it is not going to form part of an aqueous dispersion of multi-polymer particles, it must be capable of being dissolved or dispersed in water. This can be achieved by, for example, using an epoxide constituent which also comprises water soluble groups, or by using a suitable surfactant.

The dispersion constituent for use in our invention is an aqueous dispersion, the disperse particles of which may comprise homopolymer, copolymer or multi-polymer particles. In the case where multi-polymer particles are present, the "pre-formed polymer" is preferably the epoxide constituent or the reactive constituent it is permissible to have both constituents in different multi-polymer particle dispersions. It is also permissible for the multi-polymer particles to comprise, instead of or in addition to one or both of these two constituents, material which is different from these constituents. Such different material (which may be polymeric or non-polymeric) may be included, for example, to achieve a particular balance of properties.

The range of monomers suitable for preparation of the addition polymer for use in the dispersion constituent of this invention is large and depends on the desired final properties of the polymer. Examples of suitable ethylenically unsaturated monomers include styrene, the mixed isomers of methyl styrene known as "vinyl toluene", α-methyl styrene, the $C_1$–$C_{18}$ alkyl acrylates and methacrylates and vinyl acetate. A small proportion of monomer having more than one ethylenically unsaturated double bond, e.g. divinyl benzene, can also be used, but an excessive degree of crosslinking should be avoided. It is also permissible to include a proportion of a monomer having a functional group. Such groups can enhance properties, for example, they can enhance adhesion to substrates or participate in the cross-linking reaction during film-formation. Examples of such monomers are glycidyl methacrylate and the lower ($C_1$–$C_4$-)hydroxyalkyl acrylates and methacrylates.

The aqueous dispersion, whether it comprise a single polymer or multi-polymer particles, may be prepared by any of the methods known to the art. The techniques of preparing a single copolymer dispersion are well known and a suitable copolymer can readily be prepared. Alternatively, a commercially available aqueous dispersion such as an acrylic latex may be used. Multi-polymer particle dispersions may be prepared by any of the methods known to the art. For the purposes of our invention, the multi-polymer particle dispersions may be stabilised by either conventional surfactants or the ethylenically unsaturated surfactants disclosed, for example, in European Published Application No. 0 002 252 and U.S. Pat. No. 4,413,073, or a combination of these.

When the coating compositions according to this invention are applied to a substrate, the addition polymer participates in the formation of the coating film. This participation may be assisted by the addition of any of the solvents, plasticisers or coalescing agents known to the art to improve film formation in addition polymer dispersions. However, in many cases, the other constituents of the composition can exert a plasticising effect on the addition polymer, thus rendering any such addition unnecessary.

The reactive constituent, which may be monomeric, oligomeric or polymeric, has reactive groups which will react with epoxide groups. One favoured group of compounds is that comprising polyamines and polyamides which are known to react readily with epoxide groups. The words "polyamine" and "polyamide" in this case refer to compounds having a plurality of amine and/or amide groups. They may be monomeric, for example, ethylene diamine, diethylene triamine and triethylene tetramine, or oligomeric or polymeric, for example, the "Wolfamid" (registered trade mark) series of polyamide resins available from Victor Wolf Ltd. As previously mentioned, the reactive constituent may be included in an aqueous dispersion of multi-polymer particles, but as it is generally more water-soluble or -dispersible than the epoxide constituent, we prefer to utilise the latter therein. In the case where an aqueous multi-polymer particle dispersion is not used and a two-component system is desired, the dispersion constituent may be blended with either or both of the other constituents, although we prefer to blend it solely with the epoxide constituent.

The proportions of the constituents which make up the components should be such that when the components are mixed prior to application, there should be present in the mixture from 0.2–1.5 equivalents of reactive group (of the reactive constituent) for every equivalent of epoxide group. Preferably there should be 0.5–0.9 equivalents of reactive group per equivalent of epoxide group. In addition, the addition polymer should comprise from 5%–80%, preferably 20%–60% by weight of the total solids of the film-forming components.

The compositions according to our invention may contain the normal known ingredients known to the art, such as pigments, extenders, suspending agents, coalescing agents, catalysts, thickeners and antifoams, in art-recognised quantities. The compositions are mixed prior to use and applied by any convenient means such as by brushing or spraying. They have the advantage over other water-borne systems that, while the chemical reaction between the two components and thus the ultimate film properties take some time to develop, the coating may be handled and processed long before this time. The compositions are thus useful, for example, as primer surfacers in the vehicle refinish industry or as heavy duty wall or floor finishes. In such application, they can have application and film properties equal to those of conventional solvent-based coatings combined with the economic and toxicological advantages of being water-based.

The invention is further described in the following examples in which all parts are expressed by weight.

EXAMPLE 1

Preparation and comparative testing of a coating composition according to the invention wherein the epoxide constituent and the dispersion constituent each form part of a dispersion of multi-polymer particles. The composition was a two component system (or "two-pack" system to use the terminology of the paint industry) and these components shall hereinafter be referred to as "Pack A" and "Pack B". The ratio of reactive groups to epoxide groups in the total composition was 0.52:1

Preparation of Pack A

The following ingredients were used:

| | |
|---|---|
| barytes | 21.0 parts |
| titanium dioxide | 15.5 parts |
| china clay | 22.8 parts |
| copper chromite | 1.7 parts |
| polyamide[1] | 34.0 parts |
| deionised water | 5.0 parts |

[1] a 20% solution of "Casamid" (trade mark) 362, ex Thomas Swan U.K.

Pack A was prepared by loading the abovementioned ingredients to a ball mill and grinding for 16 hours to give a dispersion whose maximum particle size was less than 10 um.

Preparation of Pack B

The following ingredients were used:

| | | |
|---|---|---|
| (a) epoxy resin[2] | 23.93 parts | |
| methyl methacrylate | 17.72 parts | |
| butyl acrylate | 5.28 parts | |
| allyl acetoacetate | 1.00 parts | |
| stabiliser[3] | 1.92 parts | |
| (b) t-butyl perbenzoate | 0.64 parts | |
| (c) deionised water | 4.83 parts | |
| (d) deionised water | 38.70 parts | |
| (e) deionised water | 4.70 parts | |
| sodium erythorbate | 0.28 parts | |
| 0.1% ferrous sulphate solution | 1.00 parts | |

[2] "Dow" DER337 (ex Dow Chemicals)
[3] "Teric" N40 (ex ICI Australia Ltd.)

The stabiliser was dissolved in the epoxy resin and monomers by mixing the materials (a) and warming to 60° C. (b) was added and the mixture (a)+(b) was emulsified into (c) by high speed mixing with a Cowles blade at 2000 rpm. This gave an emulsion with an average particle size of less than 1 um and maximum size 2 um. This emulsion was then diluted with (d) and polymerisation was initiated by the addition with stirring of (e). Stirring was then stopped and the polymerisation allowed to proceed to completion.

When the coating composition is used, Pack A and Pack B are mixed in the weight ratio of 100:66.5. The mixture had a pot life of over 1 day.

Testing of composition

The composition was sprayed on to steel panels and allowed to air dry. These were touch dry in 4 hours and could be sanded after 16 hours. After 24 hours, a portion of each panel was topcoated with a commercially-available two pack isocyanate-cured acrylic enamel. For the purpose of comparison, a similar set of steel panels was sprayed first with a commercially-available two pack isocyanate filler/primer surfacer and then with the abovementioned acrylic enamel. Both sets of panels were aged at 25° C. for 7 days and then subjected to the following series of tests;

(a) Gravelometer test

A panel was hung vertically in a gravelometer and bombarded with 400 g. of fresh gravel blown at the panel by an air blast at a pressure of 551.6 kPa (80 p.s.i.). The panel was then assessed on a scale of from 1 (complete removal of the paint film) to 10 (no visible damage).

(b) Adhesion test

This was carried out according to Ford Motor Co. Test Method BI 6-1, Part A, one of a series of test methods well known to the art. A panel was cross-scribed, adhesive tape was applied to the scribes and pulled away and the adhesion estimated from the amount of paint film remaining at the cross scribes.

(c) Humidity test

This test was carried out according to Ford Test Method BI 4-2 except that the temperature was lowered to 38° C. The panels were exposed to a high humidity atmosphere in a Cleveland humidity cabinet for 240 hours and the degree of blistering assessed by eye.

(d) Hardness test

This was carried out using a "Leitz" miniload hardness tester with a load of 25 g. The diamond was allowed to remain in contact with the film for 35 sec. and then removed. The length of the resulting indentation was then measured and this was converted into a knoop value.

The results of these tests were as follows:

| | commercial isocyanate primer | | composition according to the invention | |
|---|---|---|---|---|
| | alone | topcoated | alone | topcoated |
| (a) Gravelometer | 9 | 9–10 | 8 | 9–10 |
| (b) Adhesion | excellent | excellent | excellent | excellent |
| (c) Humidity performance | good | good | good | good |
| (d) Hardness (knoops) | 10 | 14 | 7 | 14 |

It can be seen from the results that the performances of the commercial primer and the composition according to the invention are similar. The composition according to the invention has, however, the considerable advantage that it does not use potentially hazardous isocyanates.

EXAMPLE 2

Preparation of a coating composition according to the invention in which the dispersion constituent is a commercially-available copolymer. The composition was a two component system and these components shall hereinafter be referred to as "Pack "A" and "Pack B". The ratio of reactive groups to epoxide groups in the total composition was 0.52:1.

Pack A in this case is identical to Pack A used in Example 1.

Preparation of Pack B

| (a) epoxy resin[1] | 15.9 parts |
|---|---|
| stabiliser[2] | 0.8 parts |
| (b) deionised water | 3.2 parts |
| (c) deionised water | 13.5 parts |
| (d) vinyl acetate/acrylic copolymer latex[3] | 30.0 parts |

[1]"Dow" (trade mark) DER337 (ex Dow Chemicals), an epoxy resin of epoxide equivalent weight 230-250.
[2]"Teric" (trade mark) N40 (ex ICI Australia), a nonyl phenol ethoxylate surfactant.
[3]"Acropol" (trade mark) S5-65 (ex A. C. Hatrick)

The ingredients (a) were warmed to 60° C. with stirring and held there until the stabiliser had melted and dissolved in the epoxy resin. (a) was then added to (b) under high speed mixing at 2000 r.p.m. with a Cowles blade. The resulting emulsion was diluted with (c) to give an emulsion of average particle size of about 1 um. The mixture was allowed to cool and then added to (d) with slow stirring.

When the coating composition is used, Pack A and Pack B are mixed in the weight ratio of 100:63.

When tested in accordance with the methods of Example 1, the composition performed well, except that its humidity performance was slightly poorer than that of the composition of that example.

EXAMPLE 3

Preparation of a two-component coating composition according to the invention wherein the epoxide constituent and the dispersion constituent are combined in the form of a dispersion of multi-polymer particles. The ratio of reactive groups to epoxide groups in the total composition was 0.9:1.

The two components shall hereinafter be referred to as "Pack A" and "Pack B".

Pack A

| (a) barytes (high grade 40 um) | 23.43 parts |
|---|---|
| copper chromite | 1.99 parts |
| polyamide[1] | 3.92 parts |
| deionised water | 14.55 parts |
| flash rust inhibitor solution[2] | 0.40 parts |
| antifoam[3] | 0.10 parts |
| (b) deionised water | 7.00 parts |
| antifoam[3] | 0.50 parts |
| (c) deionised water | 5.26 parts |
| (d) titanium dioxide | 17.18 parts |
| china clay (1 um) | 25.24 parts |
| (e) thickener solution[4] | 0.43 parts |

[1]"Versamid" (trade mark) 125 (ex A. C. Hatrick)
[2]an aqueous solution of 9.3% sodium nitrite and 18.5% sodium benzoate.
[3]"Foamaster" (trade mark) NXZ (ex Diamond Shamrock)
[4]a 50% solution of a 9:1 mixture of "Collacral" (trade mark) PU85 and "Collacral" VL in a 60:40 mixture of propylene glycol and water Materials (a) were ball-milled for 18 hours to give a dispersion of maximum size 10 um. Materials (b) were then added to the mill and milling continued for a further 15 minutes. The mill was then emptied and washed with material (c) and the washings added to (a)+(b). Materials (c) were added to half of (a)+(b)+(c) and this mixture subjected to high speed dispersion until a dispersion of maximum size 10 um was obtained (this took about 30 minutes). The second half of (a)+(b)+(c) was then added and the mixture stirred for 5 minutes. Finally, material (e) was added with stirring.

Pack B

| (a) methyl methacrylate | 4.84 parts |
|---|---|
| butyl methacrylate | 14.73 parts |
| hydroxypropyl methacrylate | 4.89 parts |
| epoxy resin[1] | 2.45 parts |
| stabiliser[2] | 2.45 parts |
| (b) epoxy resin | 22.03 parts |
| (c) coalescing agent[3] | 4.63 parts |
| t-butyl perbenzoate | 0.65 parts |
| (d) deionised water | 4.63 parts |
| (e) deionised water | 33.56 parts |
| (f) deionised water | 2.73 parts |
| sodium erythorbate | 0.30 parts |
| 0.1% ferrous sulphate soln. | 0.95 parts |
| (g) thickener solution[4] | 1.16 parts |

[1]"Epikote" (trade mark) 828 (ex Shell Chemical Co.)
[2]"Teric" (trade mark) N40 (ex I.C.I. Australia Ltd.)
[3]"Texanol" (trade mark) (ex Eastman Chemical Co.)
[4]as material (e) in Pack A Materials (a) were heated to 60° C. with stirring, and material (b) was added and stirred until dissolved. This mixture plus materials (c) were added with high speed stirring (2000 r.p.m. with a Cowles blade) to materials (d). Stirring was maintained for 10 minutes, then material (e) was added and stirring continued for a further 5 minutes. The materials (f) were mixed and added to the mixture. Stirring was stopped at this point and the mixture allowed to exotherm. When the exotherm was complete and the mixture cooled to room temperature, it was filtered and material (g) added.

When the coating composition is used, Pack A and Pack B are mixed in a volume ratio of 1:1 (corresponding to a weight ratio of 171:97). The coating film produced therefrom performed well when subjected to the testing procedures of Example 1.

EXAMPLE 4

Preparation of a two component coating composition according to the invention wherein the epoxide constituent and the dispersion constituent are combined in the form of a dispersion of multi-polymer particles. The ratio of reactive groups to epoxide groups in the total composition was 0.4:1. The two components shall hereinafter be referred to as "Pack A" and "Pack B".

Pack A

| polyamide[1] | 15.99 parts |
|---|---|
| copper chromite | 2.12 parts |
| barytes (high grade 40 um) | 24.97 parts |
| china clay (1 um) | 26.91 parts |
| titanium dioxide | 18.31 parts |
| deionised water | 11.70 parts |

[1]20% solution of "Casamid" (trade mark) 362 (ex Thomas Swan)

The materials were loaded to a ball mill and milled for 16 hrs to give a dispersion of maximum particle size 10 um.

Pack B

| (a) epoxy resin[1] | 21.97 parts |
|---|---|
| methyl methacrylate | 8.67 parts |
| butyl acrylate | 12.45 parts |
| allyl acetoacetate | 0.89 parts |
| stabiliser[2] | 1.77 parts |
| (b) t-butyl perbenzoate | 0.66 parts |
| (c) deionised water | 4.45 parts |
| (d) deionised water | 35.28 parts |
| (e) deionised water | 4.59 parts |

| | |
|---|---|
| sodium erythorbate | 0.26 parts |
| 0.10% ferrous sulphate soln. | 0.92 parts |
| (f) coalescing agent[3] | 8.09 parts |

[1]DER661 (ex Dow Chemicals)
[2]"Teric" (trade mark) N40 (ex ICI Australia Ltd.)
[3]"Texanol" (trade mark) (ex Eastman Chemical Co.)

The materials (a) were stirred at 60° C. to dissolve the epoxy resin and stabiliser in the monomers. The mixture was then cooled to room temperature and material (b) was stirred in this mixture was then added to material (c) while (c) was being stirred at high speed with a Cowles blade at 2,000 r.p.m. (a)+(b)+(c) were then diluted with material (d) and stirred for 5 minutes. Premixed materials (e) were then added to initiate polymerisation. After the dispersion had exothermed and returned to room temperature, material (f) was added and stirred for 15 minutes.

When the coating composition is used Pack A and Pack B are combined in the weight ratio 100 to 98. The coating film produced therefrom exhibited good properties when tested according to the methods of Example 1.

EXAMPLE 5

Preparation of a two component coating composition according to the invention wherein the epoxide constituent and the dispersion constituent are combined in the form of a dispersion of multi-polymer particles. In this example, the dispersion constituent comprised 20% by weight of the film-forming solids.

The two components shall hereinafter be referred to as "Pack A" and "Pack B".

Pack A

| | | |
|---|---|---|
| (a) | titanium dioxide | 21.4 parts |
| | barytes (high grade 40 um) | 21.4 parts |
| | copper chromite | 1.0 parts |
| | deionised water | 14.9 parts |
| | polyamide[1] | 18.5 parts |
| (b) | deionised water | 6.7 parts |
| (c) | polyamide | 16.1 parts |

[1]a 20% aqueous dispersion of "Wolfamid" (trade mark) 3 (ex Victor Wolf).

The materials (a) were ground in a ball mill for 16 hours to give a dispersion whose maximum particle size was under 10 um. The mill was drained and washed out with material (b), the washings being added to (a). Material (c) was then added to (a)+(b) and stirred at high speed for 15 minutes.

Pack B

| | | |
|---|---|---|
| (a) | epoxy resin[1] | 33.33 parts |
| | methyl methacrylate | 6.79 parts |
| | butyl methacrylate | 2.71 parts |
| | hydroxypropyl methacrylate | 4.79 parts |
| | stabiliser[2] | 2.40 parts |
| (b) | t-butyl perbenzoate | 0.38 parts |
| (c) | deionised water | 5.65 parts |
| (d) | deionised water | 38.07 parts |
| (e) | sodium erythorbate | 0.17 parts |
| | 0.1% ferrous sulphate soln. | 1.0 parts |
| | deionised water | 4.71 parts |

[1]DER337 (ex Dow Chemicals)
[2]"Teric" N40 (ex I.C.I. Australia Ltd.)

The materials (a) were mixed and heated to 60° C. to dissolve the epoxy resin and stabiliser. The mixture was then cooled to room temperature and material (b) was added. (a)+(b) were then added to material (c) while stirring at 2000 rpm with a Cowles blade. After stirring for 10 minutes, material (d) was added and stirring continued for a further 5 minutes. Premixed materials (e) were added and stirring was stopped. After the exotherm has finished, the mixture was cooled to room temperature and filtered.

The coating composition was used as a mixture of Pack A and Pack B in the weight ratio of 100 to 32.3. The coating film produced therefrom exhibited excellent properties when tested according to the methods of Example 1.

EXAMPLE 6

Preparation of a two component coating composition according to the invention wherein the dispersion constituent is a commercially-available copolymer. In this example, the dispersion constituent comprised 70% by weight of the film-forming solids.

The two components shall hereinafter be referred to as "Pack A" and "Pack B".

Pack A

| | |
|---|---|
| barytes (high grade 40 um) | 21.43 parts |
| titanium dioxide | 15.82 parts |
| china clay (1 um) | 23.27 parts |
| copper chromite | 1.74 parts |
| polyamide[1] | 17.86 parts |
| deionised water | 19.88 parts |

[1]20% aqueous solution of "Casamid" (trade mark) 362 ex Thomas Swan.

The materials were loaded to a ball mill and ground for 16 hours to give a dispersion whose maximum particle size is 10 um.

Pack B

| | | |
|---|---|---|
| (a) | epoxy resin[1] | 12.38 parts |
| | stabiliser[2] | 0.62 parts |
| (b) | deionised water | 2.49 parts |
| (c) | deionised water | 10.51 parts |
| (d) | vinyl acetate/acrylic copolymer latex[3] | 74.00 parts |

[1]DER 337 (ex Dow Chemicals)
[2]"Teric" N40 (ex ICI Australia Ltd.)
[3]"Acropol" S5-65 (ex A. C. Hatrick)

The materials (a) were mixed and warmed to 60° C. to dissolve the stabiliser. They were then added without cooling to material (b) while the latter was being stirred at 2000 r.p.m with a Cowles blade. The resulting emulsion was diluted with material (c) and allowed to cool. It was then added to material (d) with stirring.

When the coating composition was used, Pack A and Pack B were mixed in the weight ratio of 100 to 70.5. The coating film produced therefrom exhibited good properties when tested according to the method of Example 1.

EXAMPLE 7

Preparation of a two component coating composition in which the reactive constituent is a modified amine.

The two components shall hereinafter be referred to as "Pack A" and "Pack B".

Pack A

| | |
|---|---|
| barytes (high grade 40 um) | 19.85 parts |

-continued

| | | |
|---|---|---|
| copper chromite | 1.71 | parts |
| titanium dioxide | 14.56 | parts |
| china clay (1 um) | 21.42 | parts |
| amine[1] | 5.28 | parts |
| deionised water | 37.18 | parts |

[1] A 50% solution of D.E.H.52 (diethylene triamine modified with liquid epoxy resin) (ex Dow Chemicals)

The materials were loaded to a ball mill and ground for 16 hours to give a dispersion whose maximum particle size was 10 um.

Pack B

This was identical to the Pack B of Example 2 except that 3.5% by weight of "Texanol" coalescing agent was added with stirring to the polymerised dispersion. Stirring was continued for 15 minutes.

When the coating composition was used, Pack A and Pack B were mixed in the weight ratio of 100 to 75.9. The coating film produced therefrom exhibited good properties when tested according to the methods of Example 1.

EXAMPLE 8

Preparation of a two component coating composition which utilises a high molecular weight epoxy resin. This epoxy resin forms part of a dispersion of multi-polymer particles.

The two components shall hereinafter be referred to as "Pack A" and "Pack B".

Pack A

Identical to Pack A of Example 4.

Pack B

| | | | |
|---|---|---|---|
| (a) | epoxy resin[1] | 23.80 | parts |
| | butyl acrylate | 22.84 | parts |
| | allyl acetoacetate | 0.96 | parts |
| | stabiliser[2] | 1.92 | parts |
| (b) | t-butyl perbenzoate | 0.64 | parts |
| (c) | deionised water | 4.80 | parts |
| (d) | deionised water | 35.76 | parts |
| (e) | deionised water | 8.00 | parts |
| | sodium erythorbate | 0.28 | parts |
| | 0.1% ferrous sulphate soln. | 1.00 | parts |

[1] "Epikote" 1004 (ex Shell Chemical Co.)
[2] "Teric" N40 (ex ICI Australia Ltd.)

The materials (a) were mixed and heated with stirring to 60° C. to dissolve the epoxy resin. The mixture was then cooled and material (b) was added. (a)+(b) were then added to material (c) with stirring at 2000 rpm with a Cowles blade. After stirring for 10 minutes, the mixture was diluted with material (d) and stirring continued for a further 5 minutes. The premixed materials (e) were then added and the mixture allowed to exotherm. When the resulting dispersion was at ambient temperature, 6.5% by weight of "Texanol" coalescing agent was added and stirred in gently for 15 minutes.

When the coating composition was used, Pack A and Pack B were combined in the weight ratio of 100 to 96. The coating film produced therefrom exhibited good properties when tested according to the methods of Example 1.

EXAMPLE 9

Preparation of a two component coating composition which utilises a polyglycol epoxy resin and a catalyst. The epoxy resin forms part of a dispersion of multi-polymer particles.

The two components shall hereinafter be referred to as "Pack A" and "Pack B".

Pack A

| | | |
|---|---|---|
| barytes (high grade 40 um) | 21.85 | parts |
| titanium dioxide | 16.03 | parts |
| china clay (1 um) | 23.56 | parts |
| copper chormite | 1.85 | parts |
| polyamide[1] | 27.18 | parts |
| deionised water | 8.76 | parts |
| catalyst[2] | 0.77 | parts |

[1] 20% solution of "Casamid" 362 (ex Thomas Swan)
[2] DMP 30 (2,4,6-tri(dimethylamino)phenol) (ex Rohm and Haas Co.)

Pack A was prepared in the same way as Pack A of Example 1.

Pack B

| | | | |
|---|---|---|---|
| (a) | epoxy resin[1] | 15.18 | parts |
| | epoxy resin[2] | 6.48 | parts |
| | methyl methacrylate | 15.40 | parts |
| | butyl acrylate | 1.97 | parts |
| | hydroxypropyl methacrylate | 4.33 | parts |
| | stabiliser[3] | 2.18 | parts |
| (b) | t-butyl perbenzoate | 0.58 | parts |
| (c) | deionised water | 4.41 | parts |
| (d) | deionised water | 35.05 | parts |
| (e) | deionised water | 4.30 | parts |
| | sodium erythorbate | 0.25 | parts |
| | 0.1% ferrous sulphate soln. | 0.91 | parts |
| (f) | Coalescing agent[4] | 8.96 | parts |

[1] DER337 (ex Dow chemicals)
[2] DER732 polyglycol epoxy (ex Dow Chemicals)
[3] "Teric" N40 (ex ICI Australia Ltd.)
[4] "Texanol" (ex Eastman Chemical Co.)

Pack B was prepared in the same way as was Pack B in Example 4.

When the coating composition was used, Pack A and Pack B were combined in the weight ratio of 100 to 55. The coating film produced therefrom exhibited good properties when tested according to the methods of Example 1.

EXAMPLE 10

Preparation of a two component coating composition according to the invention for use as a wall finish. The two components shall hereinafter be referred to as "Pack A" and "Pack B".

Preparation of multi-polymer particle dispersion

| | | | |
|---|---|---|---|
| (a) | epoxy resin[1] | 9.51 | parts |
| (b) | epoxy resin[2] | 14.27 | parts |
| | methyl methacrylate | 11.59 | parts |
| | butyl methacrylate | 7.43 | parts |
| | hydroxypropyl methacrylate | 4.76 | parts |
| | stabiliser[3] | 2.47 | parts |
| (c) | t-butyl perbenzoate | 0.59 | parts |
| (d) | deionised water | 4.76 | parts |
| (e) | deionised water | 38.34 | parts |
| (f) | deionised water | 5.05 | parts |
| | sodium erythorbate | 0.30 | parts |
| | 0.1% ferrous sulphate soln. | 0.93 | parts |

[1] DER662 (ex Dow Chemicals)
[2] "Epikote" 828 (ex Shell Chemical Co.)
[3] "Teric" N40 (ex ICI Australia Ltd.)

Materials (b) were mixed and stirred at 60° C., and material (a) was added, stirring being continued until the epoxy resin was dissolved. The mixture was cooled, material (c) was added and the mixture of (a)+(b)+(c) added to material (d) while this was being stirred at 2000 rpm with a Cowles blade. After stirring for 10 minutes, the mixture was diluted by adding material (e). Stirring was continued for a further 5 minutes, and premixed materials (f) were added and the mixture allowed to exotherm. when the mixture had cooled, it was filtered.

Pack A

| | | |
|---|---|---|
| (a) sodium hexametaphosphate | 0.12 | parts |
| (b) 27% ammonium hydroxide | 0.12 | parts |
| water-dispersible soya lecithin | 1.24 | parts |
| (c) titanium dioxide | 41.68 | parts |
| (d) deionised water | 9.95 | parts |
| (e) propylene glycol | 2.52 | parts |
| (f) antifoam[1] | 0.37 | parts |
| (g) thickener solution[2] | 0.71 | parts |
| (h) multi-polymer particle dispersion (as previously prepared) | 42.55 | parts |
| deionised water | 0.64 | parts |
| bactericide | 0.10 | parts |

[1]"Foamaster" NXZ (ex Diamond Shamrock Corp.)
[2]a 50% solution of GR708 (ex Rohm and Haas Co.) in a 60/40 mixture of propylene glycol and water.

Material (a) was dissolved in material (d), then materials (b) were added and the mixture was stirred at high speed until all of the ingredients were incorporated (about 5 minutes). To this mixture half of material (c) was added, followed by half of material (e). When the pigment was incorporated, the remainder of both materials (c) and (e) was added and the mixture stirred at high speed until the dispersion had a maximum particle size of less than 1 um (this took about 30 minutes). Material (f), and then material (g) were added; finally, material (h) was added and thoroughly incorporated with slow stirring, and the mixture was filtered.

Pack B

| | | |
|---|---|---|
| (a) polyamide[1] | 9.96 | parts |
| deionised water | 21.19 | parts |
| (b) deionised water | 68.85 | parts |

[1]"Versamid" (trade mark) 125 (ex A. C. Hatrick)

The materials (a) were mixed under high speed stirring with a Cowles blade until the polyamide was well incorporated (about 10 minutes). The mixture was then diluted slowly with material (b).

When the coating composition was used, Pack A and Pack B were mixed in the ratio of 2 to 1 (by volume) or 100 to 33.9 (by weight). The coating composition could be applied to a wall by any conventional means to give a film which not only had excellent mechanical properties but also developed these properties very soon after application.

EXAMPLE 11

Preparation of a two component coating composition which uses a high molecular weight polyamide and a low molecular weight epoxy. The polyamide forms part of a dispersion of multi-polymer particles. The epoxy is emulsified in water.

The two components shall hereinafter be referred to as "Pack A" and "Pack B".

Pack A

| | | |
|---|---|---|
| (a) epoxy resin[1] | 31.01 | parts |
| stabiliser[2] | 1.63 | parts |
| (b) deionised water | 6.22 | parts |
| (c) deionised water | 61.14 | parts |

[1]DER 337 (ex Dow Chemical Co.)
[2]"Teric" N40 (ex ICI Australia)

The materials (a) were mixed and warmed to 60° C. to dissolve the stabiliser. They were then added without cooling to material (b) while stirring at 200 rpm with a Cowles blade. The resulting emulsion was diluted with material (c) and allowed to cool.

Pack B

| | | |
|---|---|---|
| (a) polyamide[1] | 35.27 | parts |
| methyl methacrylate | 6.24 | parts |
| butyl acrylate | 3.96 | parts |
| hydroxypropyl methacrylate | 2.60 | parts |
| stabiliser[2] | 1.92 | parts |
| (b) t-butyl perbenzoate | 0.32 | parts |
| (c) deionised water | 5.21 | parts |
| (d) deionised water | 34.94 | parts |
| (e) deionised water | 8.01 | parts |
| sodium erythorbate | 0.52 | parts |

[1]"Versamid 100" (Ex A. C. Hatrick)
[2]"Teric" N40 (ex ICI Australia Ltd.)

The materials (a) were stirred together at 60° C. to dissolve the polyamide and the stabiliser in the monomers. The mixture was then cooled to room temperature and material (b) was stirred in; this mixture was then added to material (c) while (c) was being stirred at 2000 rpm with a Cowles blade. After stirring for 10 minutes, material (d) was added and stirring was continued for a further 5 minutes. Materials (e) were mixed and added to the mixture. Stirring was stopped and the mixture allowed to exotherm. After the exotherm had finished, the mixture was cooled to room temperature and filtered.

The coating composition was used as a mixture, Pack A and Pack B in the weight ratio of 28.9 to 71.1. Films of this composition cured overnight at 25° C. and exhibited good water resistance.

EXAMPLE 12

Preparation of a two component coating composition according to the invention which uses an acrylic polymer of high glass transition temperature (Tg). This acrylic polymer formed part of a dispersion of multi-polymer particles.

The two components shall hereinafter be referred to as "Pack A" and "Pack B".

Pack A

| | | |
|---|---|---|
| (a) epoxy resin[1] | 31.74 | parts |
| methyl methacrylate | 13.61 | parts |
| stabiliser[2] | 2.27 | parts |
| (b) t-butyl perbenzoate | 0.37 | parts |
| (c) deionised water | 4.29 | parts |
| (d) deionised water | 39.73 | parts |
| (e) deionised water | 2.11 | parts |
| sodium erythorbate | 0.16 | parts |
| 0.1% ferrous sulphate solution | 0.95 | parts |

-continued

| (f) Coalescent[3] | 4.77 parts |

[1]"Epikote" 828 (ex Shell Chemical Co)
[2]"Teric" N40 (ex ICI Australia)
[3]"Texanol" (Trade Mark) (Eastman Chemical)

The materials (a) were mixed and heated to 60° C. The mixture was then cooled and material (b) was added. (a)+(b) was then added to material (c) with stirring at 2000 r.p.m. with a Cowles blade. After stirring for 10 minutes, the mixture was diluted with material (d) and stirring was continued for a further 5 minutes. The materials (e) were mixed and added and the mixture was allowed to exotherm. When the resulting dispersion was at ambient temperature, materials (f) were added and the mixture was stirred gently for 15 minutes.

Pack B

| (a) Polyamide | 10.00 parts |
| (d) deionised water | 90.00 parts |

Material (a) was added to material (b) with stirring, stirring being continued until material (a) was thoroughly dispersed.

When the coating composition was used, packs A and B were combined in the weight ratio of 35 to 65.

The above composition gave hard opaque films after 24 hours, which films hardened further on baking for ½ hr at 60° C.

EXAMPLE 13

Preparation of a two component coating composition according to the invention in which the stabiliser for the multi-polymer particles is made up a reactive and non reactive type in a ratio of 1:4 parts:

The two components shall hereinafter be referred to as "Pack A" and "Pack B".

Pack A

Pack A in this case is identical to Pack A used in Example 3.

Pack B

As in Pack B in example 3 except that the stabiliser in this case was made up of 1.96 parts "Teric" N40 and 0.49 parts of the stabilising compound described in Example 1 of U.S. Pat. No. 4,413,073.

We claim:

1. An aqueous coating composition comprising at least two discrete film-forming components which are mixed prior to application of the composition to a substrate and which react to form a continuous, cross-linked coating film, the components together including
    (a) a constituent which comprises epoxide groups;
    (b) a constituent which comprises addition polymer; and
    (c) a constituent which comprises reactive groups which are capable of reaction with epoxide groups, characterised in that
    (d) the constituent (a) comprises on average at least one epoxide group per molecule and has a number average molecular weight of from 200-10,000;
    (e) the addition polymer of constituent (b) comprises from 5-80% by weight of the film-forming solids and is in the form of an aqueous dispersion and further characterised in that the particles of the dispersion of addition polymer additionally comprise at least one of the other constituents and;
    (f) there is present in the composition from 0.2-1.5 equivalents of reactive groups per equivalent of epoxide groups.

2. An aqueous coating composition according to claim 1, characterised in that the particles of addition polymer comprise at least one polymer other than the addition polymer.

3. An aqueous coating composition according to claim 1, characterised in that the constituent which comprises epoxide groups comprises on average about two epoxide groups per molecule.

4. An aqueous coating composition according to claim 1, characterised in that the constituent which comprises epoxide groups has a number average molcular weight of from 350-1200.

5. An aqueous coating composition according to claim 1, characterised in that there are from 0.5-0.9 equivalents of reactive group per equivalent of epoxide group.

6. An aqueous coating composition according to claim 1, characterised in that the addition polymer comprises from 20%-60% by weight of the film-forming solids.

* * * * *